United States Patent [19]

Coplin

[11] Patent Number: 5,182,904
[45] Date of Patent: Feb. 2, 1993

[54] GAS TURBINE ENGINE POWER UNIT

[75] Inventor: John F. Coplin, Derby, England

[73] Assignee: Rolls-Royce Business Ventures Limited, Derby, England

[21] Appl. No.: 791,404

[22] Filed: Nov. 14, 1991

[30] Foreign Application Priority Data

Dec. 14, 1990 [GB] United Kingdom ................. 9027161

[51] Int. Cl.⁵ ............................. F02C 3/04; F02C 7/10
[52] U.S. Cl. ................................ 60/39.161; 60/39.511
[58] Field of Search ....................... 60/39.161, 39.511; 137/625.46, 625.47; 251/309, 310

[56] References Cited

U.S. PATENT DOCUMENTS 2,529,973 11/1950 Sedille et al. ..................... 60/39.161
2,731,792 1/1956 Nalliuger ............................. 60/602
4,414,805 11/1983 Walker .

FOREIGN PATENT DOCUMENTS 0231567 8/1987 European Pat. Off. .
620492 3/1949 United Kingdom .
640652 7/1950 United Kingdom .
651319 3/1951 United Kingdom .
674480 6/1952 United Kingdom .
686064 1/1953 United Kingdom .
865785 4/1961 United Kingdom .
2199083 6/1988 United Kingdom .
2232720 12/1990 United Kingdom .

Primary Examiner—Louis J. Casaregola
Attorney, Agent, or Firm—Oliff & Berridge

[57] ABSTRACT

A gas turbine engine power unit (10) comprises a gas generator (11) having a valve (21) located at its downstream end. The valve (21) receives the exhaust efflux of the gas generator (11) and directs it either to a plurality of turbochargers (32) to boost the output power of the unit (10) or to a plurality of heat exchangers (39) to provide regeneration of the unit (10). The valve (21) comprises a rotary portion (20) which rotates within a static portion (28) to provide alignment of apertures within both portions (20,28) to facilitate the direction of the gas generator (11) exhaust efflux.

5 Claims, 2 Drawing Sheets

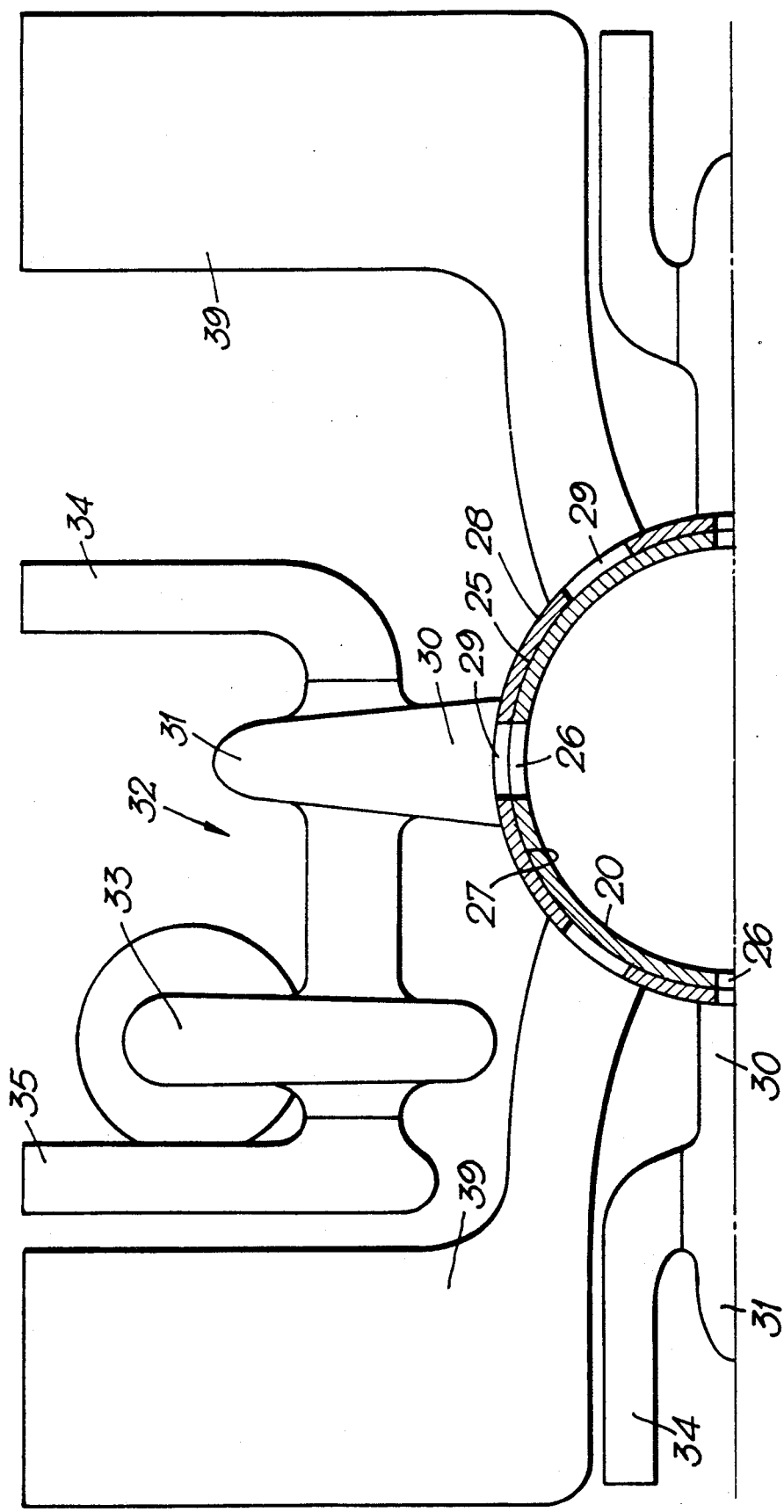

GAS TURBINE ENGINE POWER UNIT invention relates to a gas turbine engine power unit and in particular to a gas turbine engine power unit which is suited to powering a vehicle.

When a gas turbine engine power unit is used for powering a vehicle, conflicting demands are placed upon that unit with regard to efficiency and performance. Clearly from the point of view of efficiency, it is desirable that the power unit should use as little fuel as possible. It is well known to achieve high efficiency by providing a gas turbine engine power unit of the so-called "recuperator" type. In such power units, the exhaust efflux from the unit's gas generator is directed through a heat exchanger which serves to place the efflux in heat exchange relationship with compressed air delivered from the compressor of the gas generator. Consequently the compressor exhaust air is heated prior to being directed into the combustion system of the gas generator and the exhaust efflux of the unit is cooled.

Such a power unit configuration provides good thermodynamic efficiency at low power conditions for all normal operating conditions. It is not so effective, however, if the unit is required to provide a sudden increase in output power. This could occur from time to time if the unit were to be used for powering a vehicle when high acceleration, high tractive effort or very high speed are demanded.

Such a sudden increase in output power can be achieved by providing a gas turbine engine power unit in which the heat exchanger is by-passed. The exhaust efflux is instead directed to drive a turbocharger which is linked to the air inlet of the gas generator. The turbocharger provides a large increase in the amount of air supplied to the gas generator and this, together with an appropriate increase in fuel flow, provides a significant boost in the units' output power compared with what would have been the case using the heat exchanger to provide regeneration. Intercooling between the turbocharger and gas generator air entry further increase the air mass flow which can be swallowed by the engine and hence further increases the maximum power when appropriately fueled.

It is known from, for instance, UK Patent No. 651,319 to provide a gas turbine engine power unit which is capable of switching between operation using a turbocharger and operation using a heat exchanger. Thus under low power conditions when fuel efficiency is required, a heat exchanger is used to provide recuperation. However under high power conditions the heat exchanger is by-passed and the unit exhaust efflux used to drive a turbocharger.

It is an object of the present invention, to provide a gas turbine engine power unit having a valve system which readily facilitates the transition between the previously mentioned low and high power modes of operation.

According to the present invention, a gas turbine engine power unit comprises a gas generator, at least one heat exchanger to facilitate recuperative operation of said gas generator, at least one turbocharger adapted to boost the air supply to said gas generator and a valve system to receive the exhaust efflux of said gas generator and direct said efflux to either said at least one heat exchanger or alternatively to said at least one turbocharger to drive said turbocharger, said valve comprising two circular cross-section ducts arranged coaxially with radially abutting faces, each of said radially abutting surfaces having apertures therein, said ducts being relatively movable between a first position in which said apertures are so aligned to permit the passage of said exhaust efflux only to said at least one heat exchanger, and a second position in which said apertures are so aligned as to permit the passage of said exhaust efflux only to said at least one turbocharger to drive said turbocharger.

The present invention will now be described, by way of example, with reference to the accompanying drawings in which:

FIG. 2 is a partially sectioned schematic view of the gas turbine engine power unit shown in FIG. 1 when viewed in the direction of arrow A.

Figure 1:
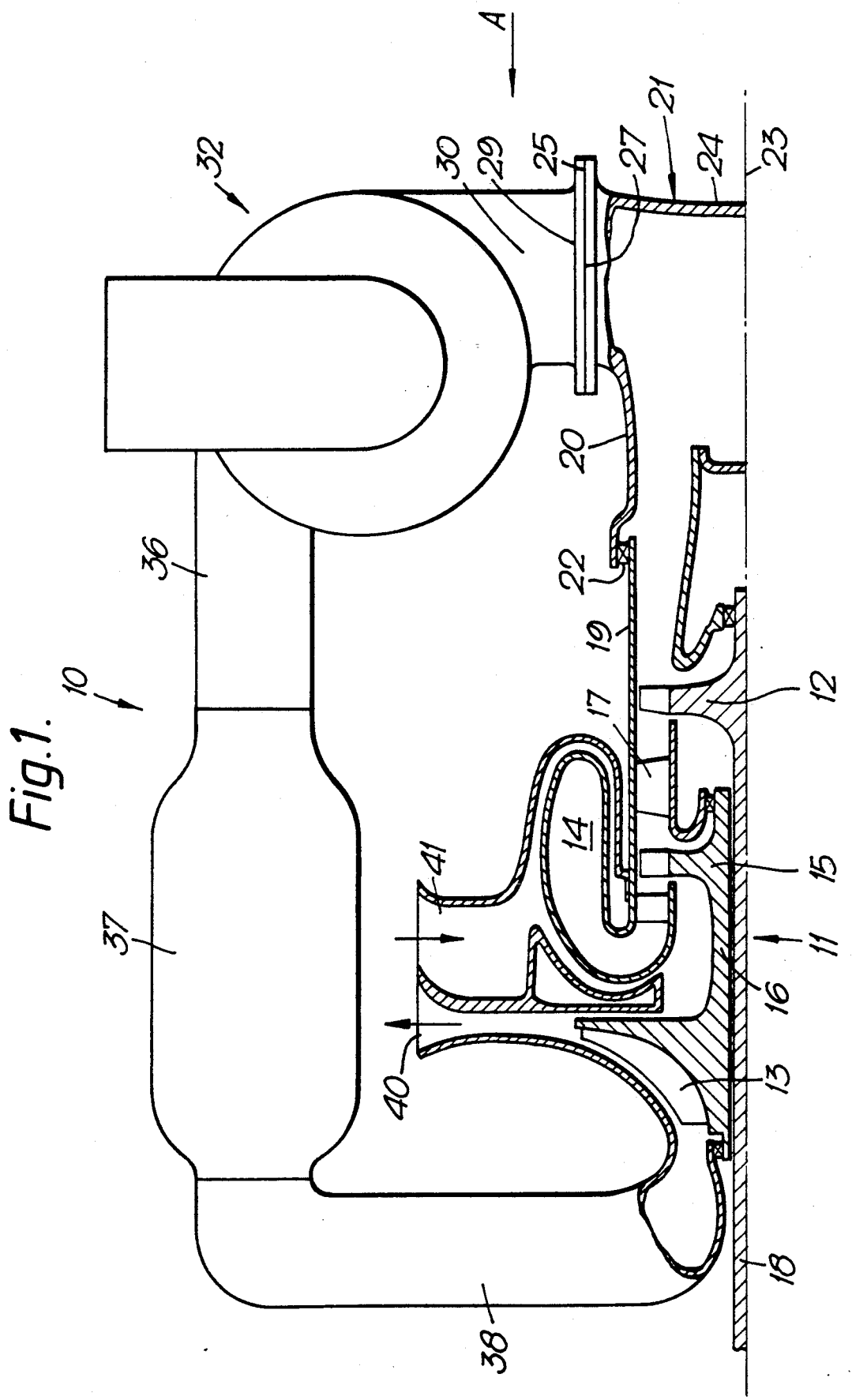
FIG. 1 is a partially sectioned schematic side view of the upper half of a gas turbine engine power unit in accordance with the present invention.

With reference to FIG. 1, a gas turbine engine power unit generally indicated at 10 comprises a gas generator 11, and a power turbine 12. The gas generator 11 is of conventional configuration comprising a centrifugal flow compressor 13, combustion equipment 14 and an axial flow turbine 15. The turbine 15 is interconnected with compressor 13 by a shaft 16 to facilitate drive therebetween.

Immediately downstream of the turbine 15 there is provided an annular array of guide vanes 17 which direct the exhaust efflux of the gas generator 11 on to the power turbine 12 so as to drive that power turbine 12. An output shaft 18 attached to the power turbine 12 transmits drive from the power turbine 12 to an appropriate source such as an electrical generator or gearbox (not shown).

The gas generator turbine 15 and the power turbine 12 are housed within a common static casing 19. The casing 19 extends downstream of the power turbine 12 to provide partial support for the rotary portion 20 of a valve 21. Thus a bearing 22 is interposed between the upstream end of the valve rotary portion 20 and the downstream end of the turbine casing 19 to facilitate that support. The valve rotary portion 20 is thereby capable of rotation about the longitudinal axis 23 of the gas generator 11.

The valve rotary portion 20 is in the form of a duct of circular cross-section form; the downstream part of the duct being of greater diameter than the upstream part. A cover 24 blanks off the downstream end of the rotary valve portion 20.

The larger diameter part of the rotary valve portion 20 additionally defines an axially elongate circumferential surface 25 which, as can be seen in FIG. 2, is provided with a series of circumferentially spaced apart apertures 26. The surface 25 radially abuts a corresponding circumferential surface 27 provided on the static portion 28 of the valve 21. The valve static portion 28 is also of circular cross-sectional form and surrounds the valve rotary portion 20 downstream part in coaxial relationship therewith. The valve static portion 28 serves to support the valve rotary portion 20 downstream end in such a way as to permit relative rotation to take place between them.

The circumferential surface 25 on the valve static portion 28 is provided with a series of apertures 29 which are similar to those apertures 26 provided in the valve rotary portion 20. However whereas four apertures 26 are provided in the valve rotary portion 20, eight apertures 29 are provided in the valve static portion 28.

In a first mode of operation of the power unit 10, the valve rotary portion 20 is positioned so that its four apertures 26 are aligned with four of the eight apertures 29 in the valve static portion 28.

The gas generator 11 exhaust efflux which is exhausted from the power turbine 12, is discharged into the valve rotary portion 20 to flow through the four apertures 26 in the valve rotary portion 20 and subsequently into the previously mentioned four of the eight apertures 29 in the valve static portion 28. Those four apertures 29 in the valve static portion 28 respectively direct the exhaust efflux into four similar generally radially extending ducts 30 equally spaced around the periphery of the valve static portion 28. Each of the ducts 30 direct a portion of the exhaust efflux into the turbine 31 of a turbocharger 32. The four turbochargers 32 are similar to each other and are equally spaced around the valve stator portion 28.

Each of the turbines 31 of the turbochargers 32 is driven by the exhaust efflux and in turn drives a compressor 33 by a drive shaft (not shown). The exhaust efflux finally leaves the turbocharger turbine 31 through an exhaust duct 34.

The turbocharger compressors 33 draw in ambient air through inlet ducts 35, compress that air and then direct it through ducts 36 to conventional intercoolers 37. The intercoolers 37, of which there are four, one corresponding with each of said turbochargers 32, serve to cool the air discharged from the compressors 33. The thus cooled air is then directed through further ducts 38 to the inlet of the centrifugal flow compressor 13.

In the first mode of operation of the power unit 10 described above, the turbocharging of the air supply to the centrifugal flow compressor 13 together with an appropriate fuel supply to the combustion equipment 14 results in the power unit 10 providing a high power output through the power output shaft 18. However, if such high power output is not required, the valve rotary portion 20 is rotated about the longitudinal axis 23 until the four apertures 26 therein are instead aligned with the remaining four of the eight apertures 29 in the valve static portion 28. Consequently the gas generator 11 exhaust efflux is no longer directed into the radially extending ducts 30 and the turbochargers 32. Instead, the exhaust efflux is directed into four similar heat exchangers 39 which are spaced apart around the periphery of the power unit 10.

The heat exchangers 39 have been omitted from FIG. 1 in the interests of clarity. However each heat exchanger 39 is interposed between circumferentially adjacent turbochargers 32 as can be seen in FIG. 2, and extends in a generally upstream direction to interconnect with the exhaust outlet 40 of the centrifugal flow compressor 13. Additionally each of the heat exchangers 39 is interconnected with a circumferential duct 41 which directs air to the combustion equipment 14.

In this second mode of operation of the power unit 10 the heat exchangers 39 serve to place the gas generator 11 exhaust efflux in heat exchange relationship with compressed air exhausted from the centrifugal flow compressor 13. Consequently compressed air from the compressor exhaust outlet 40 is directed into the heat exchangers 39 where it is heated by the gas generator 11 exhaust efflux. The thus heated air is then directed from the heat exchanger 39 into the duct 41 and from there into the combustion equipment 14.

The heating of the compressor 13 exhaust air by the power unit 10 exhaust efflux serves to increase the overall efficiency of the power unit 10 under low power conditions. The heat exchangers 39 therefore constitute recuperators for the gas generator 11.

The gas generator 11 exhaust efflux is correspondingly cooled in its passage through the heat exchanger 39 and is subsequently discharged to atmosphere.

It will be seen therefore that the gas turbine engine power unit 10 may be readily changed between a first mode of operation in which its power output is high and a second mode of operation in which its power output is lower. However in the lower power mode of operation, the unit operates at greater efficiency than it does in the high power mode of operation. The change is easily achieved by the actuation of the valve system 21.

In a typical application of the gas turbine engine power unit 10 powering a road vehicle, the low power, efficient mode of operation would be utilised under steady state cruise conditions or conditions in which strong acceleration is not required. The high power mode of operation would be used when, for instance, strong acceleration is required or other conditions in which a significant increase in the power output of the power unit is required.

I claim:

1. A gas turbine engine power unit comprising a gas generator, a plurality of heat exchangers to facilitate recuperative operation of said gas generator, a plurality of turbo-chargers adapted to boost the air supply to said gas generator, and a valve to receive the exhaust efflux of said gas generator and to direct said efflux to one of said heat exchangers and said turbochargers to drive said turbochargers, said valve comprising two circular cross-section ducts arranged coaxially with radially abutting faces, each of said radially abutting faces having apertures therein, said ducts being relatively movable between a first position in which said apertures are so aligned as to permit the passage of said exhaust efflux only to said heat exchangers, and a second position in which said apertures are so aligned as to permit the passage of said exhaust efflux only to said turbochargers to drive said turbochargers, said heat exchangers and turbochargers being located around the periphery of said power unit in circumferentially alternating relationship.

2. A gas turbine engine power unit as claimed in claim 1 wherein said valve ducts are relatively rotatable.

3. A gas turbine engine power unit as claimed in claim 2 wherein said valve comprises a rotary portion and a static portion, said rotary portion being mounted for rotation on the downstream end of said gas generator.

4. A gas turbine engine power unit as claimed in claim 3 wherein said valve rotary portion is mounted coaxially with the longitudinal axis of said gas generator.

5. A gas turbine engine power unit comprising a gas generator, at least one heat exchanger to facilitate recuperative operation of said gas generator, at least one turbocharger adapted to boost the air supply to said gas generator, and a valve to receive the exhaust efflux of said gas generator and to direct said efflux to one of said at least one heat exchanger and said at least one turbocharger to drive said turbocharger, said valve comprising a rotary portion and a static portion, said rotary portion being mounted for rotation on the downstream end of said gas generator coaxial with the longitudinal axis of said gas generator, said valve further comprising two circular cross-section ducts arranged coaxially with radially abutting faces, each of said radially abutting faces having apertures therein, said ducts being relatively rotatable between a first position in which said apertures are so aligned as to permit the passage of said exhaust efflux only to said at least one heat exchanger, and a second position in which said apertures are so aligned as to permit the passage of said exhaust efflux only to said at least one turbocharger to drive said turbocharger.

* * * * *